United States Patent [19]

Rowe

[11] 4,388,218
[45] Jun. 14, 1983

[54] REGENERATION OF CRACKING CATALYST IN TWO SUCCESSIVE ZONES

[75] Inventor: Frederick Rowe, Middlesbrough, England

[73] Assignee: Imperial Chemical Industries PLC, London, England

[21] Appl. No.: 304,675

[22] Filed: Sep. 22, 1981

Related U.S. Application Data

[63] Continuation of Ser. No. 924,065, Jul. 12, 1978, abandoned.

[30] Foreign Application Priority Data

Jul. 28, 1977 [GB] United Kingdom .............. 31758/77

[51] Int. Cl.³ .................... B01J 21/20; B01J 29/38; C10G 11/18
[52] U.S. Cl. ................... 252/417; 48/197 R; 208/50; 208/164; 252/418; 252/420; 422/142; 422/144
[58] Field of Search .............. 252/416–420; 208/46, 49, 50, 52, 53, 57, 76, 148–149, 153–154, 113, 120, 127, 164, 165, 172; 423/415 A; 48/197 R, 202; 422/141, 142, 144, 145

[56] References Cited

U.S. PATENT DOCUMENTS

| | | | |
|---|---|---|---|
| 2,394,710 | 2/1946 | McAffe | 252/417 |
| 2,398,739 | 4/1946 | Greensfelder et al. | 252/417 |
| 2,414,002 | 1/1947 | Thomas et al. | 208/164 |
| 2,425,849 | 8/1947 | Voorhees | 252/417 |
| 2,488,028 | 11/1949 | Sheineman | 422/144 |
| 2,527,575 | 10/1950 | Roetheli | 208/127 |
| 2,661,321 | 12/1953 | Schutte | 252/418 |
| 2,838,461 | 6/1958 | Kollgaard | 252/416 |
| 2,846,369 | 8/1958 | Halik | 208/165 |
| 2,905,622 | 9/1959 | McCarthy | 252/411 R |
| 2,917,451 | 12/1959 | Leffer | 208/148 |
| 3,197,284 | 7/1965 | Hoekstra | 252/419 |
| 3,412,013 | 11/1968 | Rowles | 252/417 |
| 3,494,858 | 2/1970 | Luckenbach | 208/164 |
| 4,176,084 | 11/1979 | Luckenbach | 252/417 |

Primary Examiner—P. E. Konopka
Attorney, Agent, or Firm—Cushman, Darby & Cushman

[57] ABSTRACT

Process and apparatus suitable for the regeneration of catalytic cracking catalyst particles and for the heating and partial conversion of coke particles from a coking process are described. The particles are heated in two successive zones, for example formed by two fluidized beds, conditions being controlled so that (1) only partial regeneration of catalyst particles or conversion of coke particles occurs in the first zone, and (2) there is no major evolution of heat from either zone.

3 Claims, 1 Drawing Figure

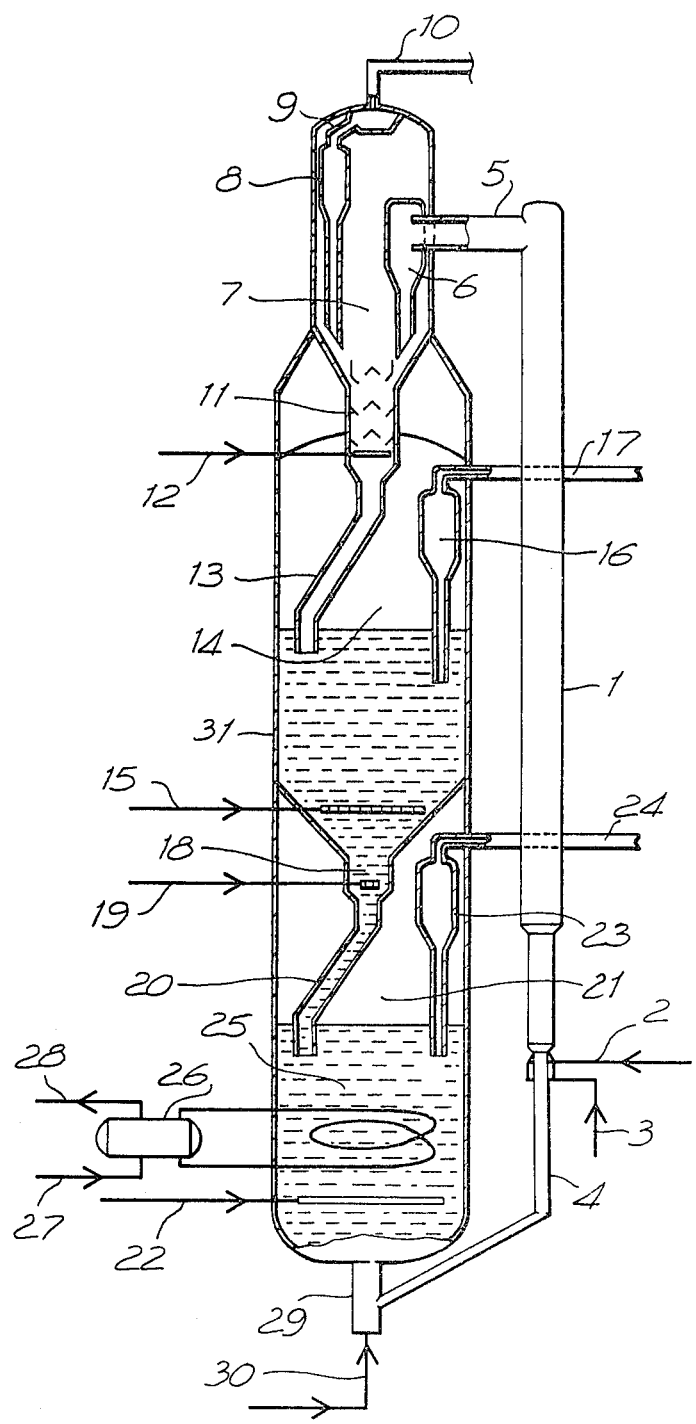

REGENERATION OF CRACKING CATALYST IN TWO SUCCESSIVE ZONES

CROSS REFERENCE TO RELATED APPLICATIONS

This application is a continuation of my earlier application Ser. No. 924,065 filed July 12, 1978 and now abandoned.

The present invention relates to hydrocarbon conversion and to a process and apparatus for the regeneration of catalytic cracking catalysts and for the treatment of coke produced in a coking process.

In catalytic cracking processes a heavy hydrocarbon oil is contacted with a solid catalyst at high temperatures and at low or moderate pressures to produce hydrocarbons of lower molecular weight and higher economic value. In the cracking reaction, a proportion of the heavy oil is converted to solid carbonaceous material, often referred to as "coke", which is laid down on the catalyst surface, thus causing some loss of catalytic activity. The activity of catalysts which have been deactivated by coke is usually restored by burning away the coke using an oxygen-containing gas stream in a separate regeneration reactor. The exothermic heat of this burning reaction increases the temperature of the catalyst particles, thereby supplying sufficient heat for the endothermic hydrocarbon cracking reaction. Any heat in excess of that required for the hydrocarbon cracking reaction is removed in the flue gases from the burning reaction. Several methods have been proposed for the utilisation of this excess heat energy which would otherwise be wasted. These methods include, for example, burning off the coke in a limited supply of oxygen, so that the flue gases contain sufficient carbon monoxide for combustion in a separate steam-raising boiler, the provision of cooling coils within the regeneration reactor itself and raising of steam by passing water through the cooling coils, or by feeding to the regeneration reactor an oxygen containing stream wherein the diluent is carbon dioxide or steam, whereby a flue-gas of higher carbon monoxide or carbon monoxide-hydrogen concentration is obtained. Such a stream is valuable as a high calorific value fuel or for passing to a separate water-gas shift reactor for conversion to a gas from which hydrogen may be recovered readily for chemical use.

In the catalytic cracking process use has been made of fixed-bed reactors, moving burden reactors, fluidised bed reactors and, with the development of more active and selective catalysts, transfer-line reactors in which the hydrocarbon cracking reaction is carried out very rapidly during the short time interval during which the catalyst is transported by an ascending stream of hydrocarbon vapour, optionally mixed with steam, from the bottom of the fluidised bed regeneration reactor to a fluidised disengaging bed above the regeneration reactor. In the disengaging bed residual hydrocarbon is stripped from the catalyst by an ascending stream of steam. The catalyst, with its layer of laid-down carbon, falls by gravity into the regeneration reactor.

Catalytic cracking processes have been developed principally for the upgrading of distillate hydrocarbon oils of low asphaltene and Conradson carbon content and with low concentrations of organically bound metals such as nickel and vanadium. The presence of these asphaltenes and metal compounds, which tend to concentrate in the residues from crude oil processes such as distillation, greatly increases the proportion of the hydrocarbon feed-stock which is laid down as coke on the cracking catalyst and can lead to rapid deactivation or loss of selectivity. Recent catalyst improvements have led to a catalyst which is sufficiently tolerant of asphaltenes and metal compounds to allow it to be used for catalytic cracking of some residual oils, particularly those of low metal content, particularly in a transfer line reactor process. Although the proportion of hydrocarbon laid down as coke is somewhat higher with residual oils than it is in a similar process treating distillate oils, the rate of catalyst deactivation is acceptably low. However, a problem remains in the much larger quantity of heat released in the regeneration reactor where the increased coke of the catalyst is burnt off. The increased requirement for oxygen-containing gas to react with the carbon has necessitated a large increase in the size of the fluidised bed reactor and the increased complexity of added steam-raising cooling coils within the reactor has added to the cost of the equipment. Reactor throughput and/or severity of cracking are limited by the heat removal capacity of the regeneration equipment, since greater throughput and/or severity increases the quantity of coke that must be burnt off in regeneration.

According to one form of the present invention a process for the regeneration of a catalytic cracking catalyst comprises:

(1) passing a partially or completely deactivated cracking catalyst into a first catalyst regeneration zone and therein effecting partial regeneration of the catalyst by contacting the catalyst at elevated temperature with a first gas stream comprising oxygen, and (2) passing partially regenerated catalyst from the first regeneration zone to a second regeneration zone and therein substantially completing regeneration of the catalyst at elevated temperature with a second gas stream comprising oxygen, the contacting and the regeneration reactions in both catalyst regeneration zones being controlled so that there is no major evolution of heat from either zone.

Coking processes, for example fluid coking, are well-known for the conversion of heavy oils, for example residual oils and cracking residues, to useful products such as, for example, gasoline and gas oil cracking stock, and for the formation of coke which is useful as metallurgical coke and electrode coke and for other uses where pure carbon is required. In fluid coking processes, a fluidised bed of catalytically inert refractory solids, for example sand but especially particulate coke produced by the process, is used and the preheated residual oil is introduced into the fluidised bed at a coking temperature. The coking temperature chosen will depend on the products which it is desired to make but, in general, the temperature will lie in the range of about 400° to 1000° C. The vaporous products of the coking are removed overhead. During the process, coke is formed and deposited on the fluidised solids. Some coke product of improved properties is withdrawn from the process to maintain the weight of solids in the fluidised bed substantially constant. The withdrawn coke particles may be stripped to remove volatile hydrocarbons therefrom and may then be burnt in air or other oxygen-containing gas to burn some of the particles and to heat them for return to the fluidised bed.

The process of this invention is an improved process for the treatment of such withdrawn coke particles.

Accordingly a further form of the present invention comprises a process for the heating and partial conversion of coke particles which comprises:

(1) passing coke particles into a first conversion zone and therein effecting heating and partial conversion of the coke particles by contacting the particles at elevated temperatures with a first gas stream comprising oxygen, and (2) passing the thus heated and partially converted coke particles from the first conversion zone to a second conversion zone and therein heating and further partially converting the coke particles at elevated temperature with a second gas stream comprising oxygen, the heating and partial conversion of the particles in both zones being controlled so that there is no major evolution of heat from either zone. Of course, in both forms of the present invention, there will be some evolution of heat from each zone in the sense that hot catalyst or coke particles will exit from each zone and some heat will be lost in the inevitable flue gases. However, it is intended that the heating and the reactions occurring should be controlled so that the catalyst or coke particles are not heated excessively and so that no more heat than is necessary is lost with the flue gases or by other means. If desired, control on the evolution of heat can be aided by, for example, the optional provision of cooling coils or by raising steam by passing water through the cooling coils.

Preferably, the regenerated catalyst is discharged from the second regeneration zone of the process at a temperature which is substantially the same as that used in catalytic cracking, for example a temperature in the range of 1250° to 1400° F. Similarly, in the alternative form of the process, it is preferred that heated and partially converted coke particles are discharged from the second conversion zone at a temperature which is substantially the same as that used in a coking, for example a fluid coking, process.

Suitably, the two regeneration/conversion zones of the process are selected from fluidised bed reactors, moving burden reactors, transfer line reactors and/or combinations of these. Preferably, the two zones comprise two fluidised bed reactors disposed substantially vertically one above the other. In this arrangement it is convenient to use the upper reactor as the first zone and to allow partially regenerated catalyst or heated and partially converted coke particles, as the case may be, to flow by gravity from the upper to the lower zone.

Preferably, the first gas stream comprises a mixture of oxygen and steam, or oxygen and carbon dioxide, or oxygen, steam and carbon dioxide. In conventional catalyst regeneration processes it is customary to use air as the source of oxygen. The use of air in the first zone of both forms of the process of this invention is not ruled out but use of oxygen and steam enables greater control to be exercised on the reactions occurring than is the case with air. In addition, of course, air contains a large amount of inert nitrogen. In the first regeneration/conversion zone, therefore, coke will be burnt off the catalyst or coke particles by the following main reactions:

(1) $C + O_2 \rightarrow CO_2 + 94.2$ K cals
(2) $C + \frac{1}{2}O_2 \rightarrow CO$ (or $2C + O_2 \rightarrow 2CO$) $+ 26.5$ K cal
(3) $C + H_2O \rightarrow CO + H_2 - 32.4$ K cals
(4) $C + 2H_2O \rightarrow CO_2 + 2H_2 - 23.6$ K cal Reactions (1) and (2) are highly exothermic and reactions (3) and (4) highly endothermic. Thus, by controlling the relative proportions of oxygen and steam which are fed to the first zone, the overall heat balance within the reactor can be controlled within wide limits. When carbon dioxide is used as well as, or instead of, steam as the diluent for oxygen, the following main reation can also occur:

(5) $C + CO_2 \rightarrow 2CO - 41.22$ K cal the endothermic effect being similar to that when steam is used (see reaction (3)).

The product gas from this first zone will be a mixture of steam, carbon monoxide, carbon dioxide and hydrogen. The exact composition will be a function of the temperature, pressure and residence time used in the zone as well as of the relative proportions of oxygen, steam and/or carbon dioxide in the first gas stream comprising oxygen which is fed to the zone. Thus, if the product gas is to go for chemical use as a synthesis gas, where the ratio of carbon monoxide to hydrogen is of importance, the relative proportions may be adjusted by varying the proportion of carbon dioxide used instead of steam. It is a particular benefit of the process of this invention in its application to the heating and partial conversion of coke particles that the operation of the process in two stages allows heating of coke particles for return to a coking process and at the same time allows the production of synthesis gas in amounts which are enhanced in comparison with prior art processes for the treatment of coke particles withdrawn from a coking process. If the product gas is to be used as a source of hydrogen, it may be cooled, more steam added to it and the mixture subjected to the water gas shift reaction to increase the hydrogen content. However, the important feature of the reaction in the first zone is that some of the carbon should be removed from the catalyst or coke particles without major net evolution of heat by adjusting the ratio of oxygen to steam and/or carbon dioxide in the first gas stream. It is convenient to operate the first zone so that, where the temperature of the associated catalytic cracking or coking process has been optimised in a certain range of temperature, say 900° to 1200° F., the temperature of catalyst or coke particles leaving the zone is within the same range of temperature. Preferably, the second gas stream comprising oxygen is an air stream. The advantages of using air lie in its cheapness and in the fact that the use of air rather than, say, oxygen enables the process operator to optimise the temperature of the particles of fully regenerated catalyst or coke to the requirements of any associated cracking or coking process respectively. Moreover, use of air means that there is little or no danger of permanently deactivating the cracking catalyst. The use of oxygen would necessitate the use of a diluent, for example steam; if steam were used there would be some danger of the deactivation of the catalyst by steam at high temperatures. Conveniently, the second zone in the process of the invention comprises a reactor of known design used as a regenerator in equipment for the catalytic cracking of distillate hydrocarbons in which carbon lay-down on the cracking catalyst is relatively small. Suitably, the second zone includes devices for example bed dividers, multiple air injectors, temperature controllers, for complete combustion of carbon to carbon dioxide or partial combustion to carbon monoxide, with an added steam-raising boiler taking the carbon monoxide-containing flue gas as part, at least, of its fuel. Optionally, the second zone includes steam-raising internal cooling equipment, for example, cooling coils.

The process of the present invention is conveniently operated so that the heat produced by combustion in the second regeneration/conversion zone is sufficient only to reheat the catalyst or coke particles to the temperature required for any associated cracking or coking process respectively, say 1250° to 1400° F., and, if desired, to raise sufficient steam to operate ancillary equipment used in the process of this invention. In the form of the process for regeneration of a cracking catalyst it in convenient to operate the process so that the carbon content of the catalyst entering the second regeneration zone is such (by suitable choice of conditions in the first regeneration zone) that the heat produced by combustion of the remaining carbon on the catalyst in the second regeneration zone is sufficient only to reheat the catalyst to the desired temperature.

The present invention also provides apparatus for the regeneration of a catalytic cracking catalyst and for the heating and partial conversion of coke particles which comprises, in combination, first and second reactors, each suitable for retaining a bed of catalyst or coke particles and each having an inlet to admit a gas stream comprising oxygen to the reactor and transfer means whereby catalyst or coke particles may be transferred from one reactor to the other. Optionally, the first and second reactors may be located within one vessel. Suitably, each reactor may comprise a fluidised bed reactor, a moving burden reactor or a transfer line reactor.

a preferred embodiment of the apparatus of this invention comprises two fluidised bed reactors, one mounted vertically above the other, with a transfer condiut between them to allow catalyst or coke particles to be passed from one reactor to the other.

One embodiment of the invention is hereinafter described in greater detail by reference to FIG. 1. The following description relates to the regeneration of a catalytic cracking catalyst but insofar as general features are concerned the described apparatus and process are also suitable for the heating and partial conversion of coke particles which have been withdrawn from a coking process.

Referring to FIG. 1, a transfer line catalytic cracking reactor 1 is provided with inlet lines 2, 3 and 4 for feed oil, steam and catalyst respectively. Reactor 1 contains an outlet 5 which leads, via a cyclone 6, to a catalyst disengaging zone 7. The disengaging zone 7 contains another cycloone or series of cyclones 8 which, together with cyclone 6, enable substantially complete separation of catalyst from product vapours. A manifold 9 and outlet 10 allow the product vapours to be removed from the system. At the base of the disengaging zone 7 is a steam stripper 11, supplied with steam through inlet 12, which leads through dip-leg 13 into the first catalyst regeneration zone 14 contained in reactor vessel 31.

The regeneration zone 14 contains a gas inlet pipe 15 as well as a cyclone or series of cylones, 16 with outlet pipe 17 for removal of gaseous products. Steam manifold 18 supplied with steam through inlet 19 enables a vapour lock to be provided in the base of regeneration zone 14. Regeneration zone 14 is linked, via dip-leg 20, to the second catalyst regeneration zone 21 also contained within reactor vessel 31.

The regeneration zone 21 contains a gas inlet pipe 22 as well as a cyclone (or series of cyclones) 23 with outlet pipe 24 for removal of gaseous products. Regeneration zone 21 also contains in this embodiment of the invention an optional series of cooling coils 25 connected to a steam drum 26 which has an inlet 27 for boiler feed water and a steam outlet 28. The base 29 of regeneration zone 21 contains a conventional control valve system (not shown), an auxiliary steam inlet 30 and is linked, by line 4, to the base of the transfer line reactor 1.

In operation, oil which is to be catalytically cracked to more valuable products is fed through line 2 to the base of reactor 1 where it is atomised by a stream of dispersion steam supplied through line 3 and contacted with an ascending stream of hot freshly-regenerated catalyst particles entering the reactor 1 through line 4. In contact with the hot catalyst, the oil vaporises and reacts to produce species of lower molecular weight, the concomitant large volume increase being sufficient to carry it and the catalyst particles rapidly through reactor 1, line 5 and cyclone 6 to the catalyst disengaging zone 7. The bulk of the catalyst particles are separated from the product vapours in cyclone 6 and essentially all the remaining catalyst particles are separated in cyclone 8. The product vapours pass from cyclone 8 through manifold 9 and outlet 10 for further processing, for example in a distillation system (not shown). Catalyst particles separated in cyclones 6 and 8 fall to the bottom of zone 7 where they are fluidised in stripper 11 by steam entering through line 12. The steam serves to strip any unvapourised hydrocarbon which may still be adsorbed on the catalyst particles and to add it to the main product stream leaving zone 7 via outlet 10. The stripping steam also acts as a vapour lock preventing any gases from the first regeneration zone 14, immediately below, reaching the disengaging zone 7 and thereby contaminating the cracking product stream.

The catalyst particles, stripped of residual hydrocarbon, but carrying a substantial layer of coke laid down during the cracking reaction in reactor 1, fall by gravity through dip-leg 13 into the first regeneration zone 14. There the particles are fluidised and oxidised by a stream oxygen and steam, optionally containing also carbon dioxide, which enters through inlet 15 and which has been pre-heated to approximately the temperature of the cracking reaction (900° to 1200° F.). The preheating can be effected by any convenient means, well-known to those skilled in this art. Alternatively, heat from the second regeneration stage may be used, for example from steam in line 28 and steam boiler 26. Partial oxidation of the coke on the catalyst particles occurs but heat release is kept to a minimum by control of the relative proportions of steam and oxygen entering through inlet 15. Additional control can be exercised by adjustment of the temperature of this pre-heated oxygen/steam stream. The gaseous reaction products comprising hydrogen, steam and carbon dioxide and/or carbon monoxide leave zone 14 through cyclone 16 and outlet 17 for further processing or chemical use or use as fuel.

The partially regnerated catalyst particles are transferred by gravity from regeneration zone 14 through the vapour lock formed by steam supplied through inlet 19 and manifold 18 and thence via dip-leg 20 into the second regeneration zone 21. Burning off of coke on the catalyst particles is completed in zone 21 by fluidising air supplied through line 22. This air may be pre-heated, if desired. The exothermic heat of reaction is used to raise the temperature of the catalyst particles to that required for cracking the oil feed supplied to reactor 1.

Surplus heat, if any, is absorbed by the water circulating in cooling coils 25 and used to raise steam in steam boiler 26. The flue gases which result from the combustion reaction are removed through cyclone 23 and outlet 24 and are passed to energy recovery equipment (not shown).

Fully regenerated catalyst particles, at the catalyst cracking temperature, are then removed from the base 29 of zone 21 and are carried via line 4, by the auxiliary fluidising stream of steam supplied through inlet 30 to the base of reactor 1. Facilities (not shown) are provided both to purge a small amount of regenerated catalyst from the base 29 of zone 21 and to add fresh actalyst to the regenerated catalyst stream entering reactor 1.

By effecting partial regeneration of the catalyst in the first zone 14, it is possible to exercise greater control and facilitate operations in the second regeneration zone 21. Careful control of the steam and oxygen or air entering the regeneration zones enables heat to be conserved and useful gaseous products to be formed.

As mentioned hereinbefore, the apparatus and process described with reference to FIG. 1 are also suitable in general terms for the heating and partial conversion of coke particles withdrawn from a coking process. In this embodiment, the coking process, for example a fluid coking process, is carried out in reactor 1 and withdrawn coke particles are removed by outlet 5. Product vapours and hydrocarbons adhering to the coke particles are removed in the disengaging zone 7. In the first heating and partial conversion zone 14, the coke particles are contacted with oxygen and steam entering through inlet 15 to partially convert the coke particles and form useful amounts of synthesis gas. Thereafter the coke particles are further treated in zone 21 and are heated to the temperature which is required to enable them to be recycled to and used in the coking process carried out in reactor 1. Other features, for example cooling coils 25 and steam boiler 26, described hereinbefore with reference to the regeneration of catalytic cracking catalyst are also appropriated for use, if desired, in the heating and partial conversion of coke particles. Careful control of the steam and oxygen or air entering zones 14 and 21 enables heat to be conserved so that a minimum of heat is lost from both zones and in addition enables useful amounts of sythesis gas to be formed.

I claim:

1. A process for treating solid particles of partially or completely deactivated cracking catalyst which process comprises:
   (1) passing said solid particles into a first fluidized bed reactor and therein contacting the solid particles at elevated temperatures with a first gas stream consisting essentially of (a) oxygen plus steam, (b) oxygen plus carbon dioxide, or (c) oxygen plus steam plus carbon dioxide and adjusting the ratio of oxygen to steam and/or carbon dioxide so that some carbon is removed form the solid particles without major net evolution of heat in the first reactor, thereby partially regenerating the said cracking catalyst particles to produce synthesis gas containing a mixture of steam, carbon monoxide, carbon dioxide and hydrogen, and thereafter
   (2) passing the thus-treated solid particles from the base of said first fluidized bed reactor downwardly by gravity to the top of a second fluidized bed reactor and therein contacting the solid particles at elevated temperature wih a second gas stream comprising oxygen thereby substantially completely regenerating the said cracking catalyst particles and removing the regenerated catalyst from the base of the second fluidized bed reactor, provided that the first fluidized bed reactor is disposed substantially vertically above the second fluidized bed reactor located within one vessel,
   the contacting and the reactions occurring in both reactors being controlled so that there is no major evolution of heat from either reactor.

2. A process as claimed in claim 1 in which the solid particles are discharged from the second zone at a temperature which is substantially the same as that used in a catalytic cracking process.

3. A process as claimed in claim 1 in which the second gas stream comprising oxygen is an air stream.

* * * * *